US011890866B2

(12) United States Patent
Yato et al.

(10) Patent No.: US 11,890,866 B2
(45) **Date of Patent: *Feb. 6, 2024**

(54) PROCESSING DEVICE AND RECORDING DEVICE INCLUDING A MEDIUM RECEIVING UNIT THAT RECEIVES A DISCHARGED MEDIUM

(71) Applicant: SEIKO EPSON CORPORATION, Tokyo (JP)

(72) Inventors: Keiichi Yato, Matsumoto (JP); Mitsuru Murata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,166

(22) Filed: Jan. 4, 2023

(65) Prior Publication Data

US 2023/0143837 A1 May 11, 2023

Related U.S. Application Data

(63) Continuation of application No. 17/474,725, filed on Sep. 14, 2021, now Pat. No. 11,565,540.

(30) Foreign Application Priority Data

Oct. 13, 2020 (JP) ................................ 2020-172431

(51) Int. Cl.
*B41J 13/10* (2006.01)
*B41J 11/42* (2006.01)
(Continued)

(52) U.S. Cl.
CPC ............ *B41J 13/103* (2013.01); *B41J 11/42* (2013.01); *B41J 11/58* (2013.01); *B41J 13/0009* (2013.01);
(Continued)

(58) Field of Classification Search
CPC . B41J 13/103; B41J 11/42; B41J 11/58; B41J 13/0009; B41J 13/106; B41J 15/18;
(Continued)

(56) References Cited

U.S. PATENT DOCUMENTS 11,565,540 B2 * 1/2023 Yato ........................ B41J 11/42
2015/0273897 A1 10/2015 Kato et al.

FOREIGN PATENT DOCUMENTS

JP 2002-234658 8/2002
JP 2015-189559 11/2015

* cited by examiner

*Primary Examiner* — Henok D Legesse
(74) *Attorney, Agent, or Firm* — WORKMAN NYDEGGER

(57) ABSTRACT

A recording device as a processing device includes: a recording unit accommodated in a housing and configured to perform recording on a medium; and a medium accommodating unit that accommodates the medium discharged from the housing. The medium accommodating unit includes: a sheet-shaped accommodating member; a rotating shaft provided inside the housing and to which one end of the accommodating member is connected; and an operating portion provided separably from the housing and to which the other end of the accommodating member is connected. The accommodating member is wound around the rotating shaft and accommodated inside the housing when the operating portion is mounted on the housing. The accommodating member is fed from the rotating shaft so that the medium is accommodated when the operating portion is separated from the housing.

13 Claims, 6 Drawing Sheets

(51) Int. Cl.

| | |
|---|---|
| ***B41J 11/58*** | (2006.01) |
| ***B41J 13/00*** | (2006.01) |
| ***B65H 31/02*** | (2006.01) |
| *B65H 31/00* | (2006.01) |
| *B65H 31/22* | (2006.01) |
| *B41J 15/18* | (2006.01) |

(52) U.S. Cl.

CPC ............ *B41J 13/106* (2013.01); *B65H 31/02* (2013.01); *B41J 15/18* (2013.01); *B65H 31/00* (2013.01); *B65H 31/22* (2013.01); *B65H 2402/32* (2013.01); *B65H 2402/33* (2013.01); *B65H 2403/41* (2013.01); *B65H 2403/48* (2013.01); *B65H 2405/324* (2013.01); *B65H 2701/11312* (2013.01); *B65H 2801/36* (2013.01)

(58) Field of Classification Search

CPC ........ B65H 31/02; B65H 31/00; B65H 31/22; B65H 2402/32; B65H 2402/33; B65H 2403/41; B65H 2403/48; B65H 2405/324; B65H 2701/11312; B65H 2801/36

See application file for complete search history.

PROCESSING DEVICE AND RECORDING DEVICE INCLUDING A MEDIUM RECEIVING UNIT THAT RECEIVES A DISCHARGED MEDIUM

This application is a continuation application of U.S. patent application Ser. No. 17/474,725, filed Sep. 14, 2021, which claims the benefit of and priority to Japanese Patent Application No. 2020-172431 filed on Oct. 13, 2020. The entire disclosures of the above-mentioned applications are hereby incorporated herein by reference.

BACKGROUND

1. Technical Field

The present disclosure relates to a processing device and a recording device.

2. Related Art

Conventionally, a recording device equipped with a stacker that receives a recorded medium to be discharged is known. JP-A-2015-189559 discloses a recording device including a basket-shaped stacker in which a flexible sheet member is loosely attached to a frame member.

However, the recording device described in JP-A-2015-189559 has a configuration in which the basket-shaped stacker is slid horizontally and stored in a lower part of the device main body in substantially the shape, so that it is difficult to miniaturize the device.

SUMMARY

A processing device includes: a processing unit accommodated in a housing and configured to process a medium; and a medium receiving unit that receives the medium discharged from the housing. The medium receiving unit includes: a sheet-shaped receiving member; a rotating shaft provided inside the housing and to which one end of the receiving member is coupled; and an operating portion provided separably from the housing and to which the other end of the receiving member is coupled. The receiving member is wound around the rotating shaft and accommodated inside the housing when the operating portion is mounted on the housing. The receiving member is fed from the rotating shaft so as to receive the medium when the operating portion is separated from the housing.

The recording device includes a recording unit that performs recording on a medium as the processing unit described above.

DESCRIPTION OF EXEMPLARY EMBODIMENTS

1. Embodiment

Figure 1:
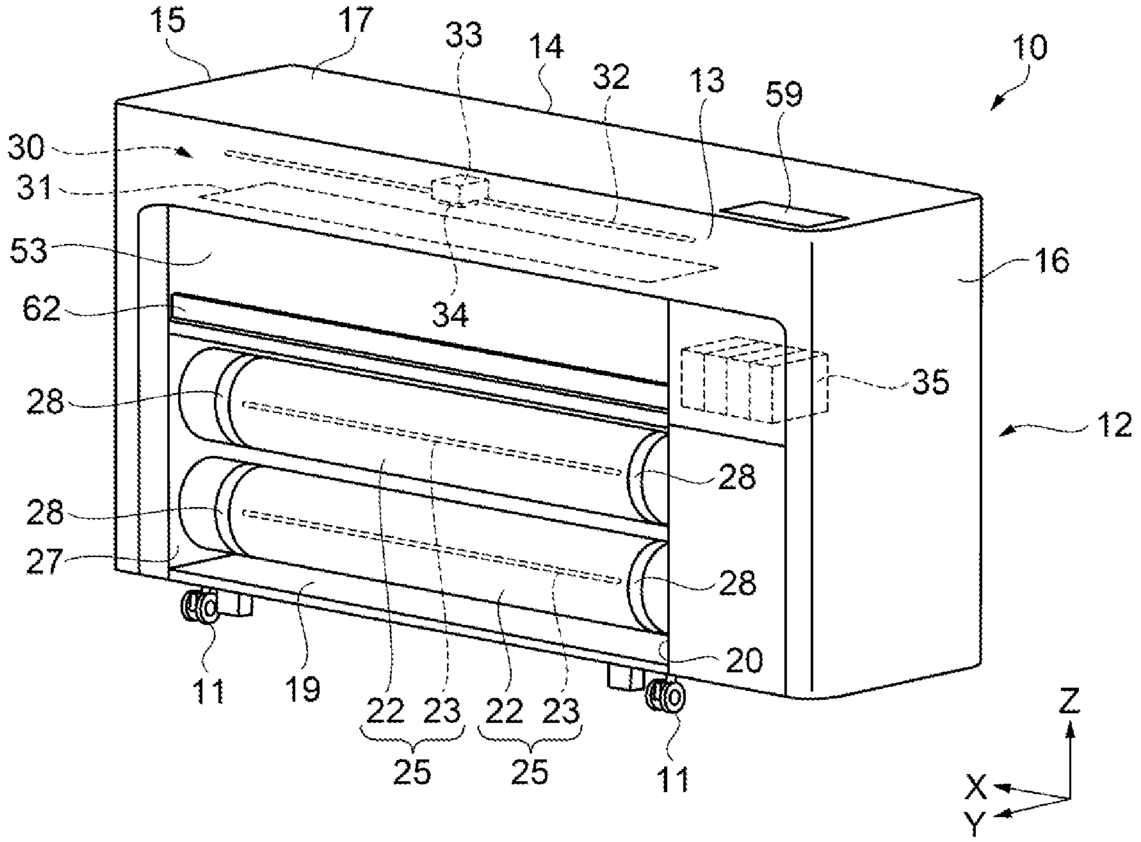
FIG. 1 is a perspective view illustrating a configuration of a recording device as a processing device according to an embodiment.

A schematic configuration of a recording device as a processing device according to the embodiment will be described with reference to the drawings. As for the coordinates illustrated in the drawings, assuming that a recording device 10 is placed on a horizontal installation surface, the three virtual axes orthogonal to each other are defined as the X-axis, the Y-axis, and the Z-axis. The X-axis is a virtual axis parallel to the left-right direction of the recording device 10. The Y-axis is a virtual axis parallel to the front-rear direction of the recording device 10. The Z axis is a virtual axis parallel to the height direction of the recording device 10. The tip side of the arrows representing the X-axis, Y-axis, and Z-axis is the "+ side", and the base end side is the "− side". The recording device includes a recording unit that performs recording on a medium as a processing unit. The recording device illustrated in the present embodiment is a large-format printer that feeds a long medium wound in a roll shape and performs recording by an ink-jet method. A large-format printer is a printer capable of performing recording on a long medium having a width of 297 mm or more, which corresponds to the short side width of A3-size sheets.

Figure 2:
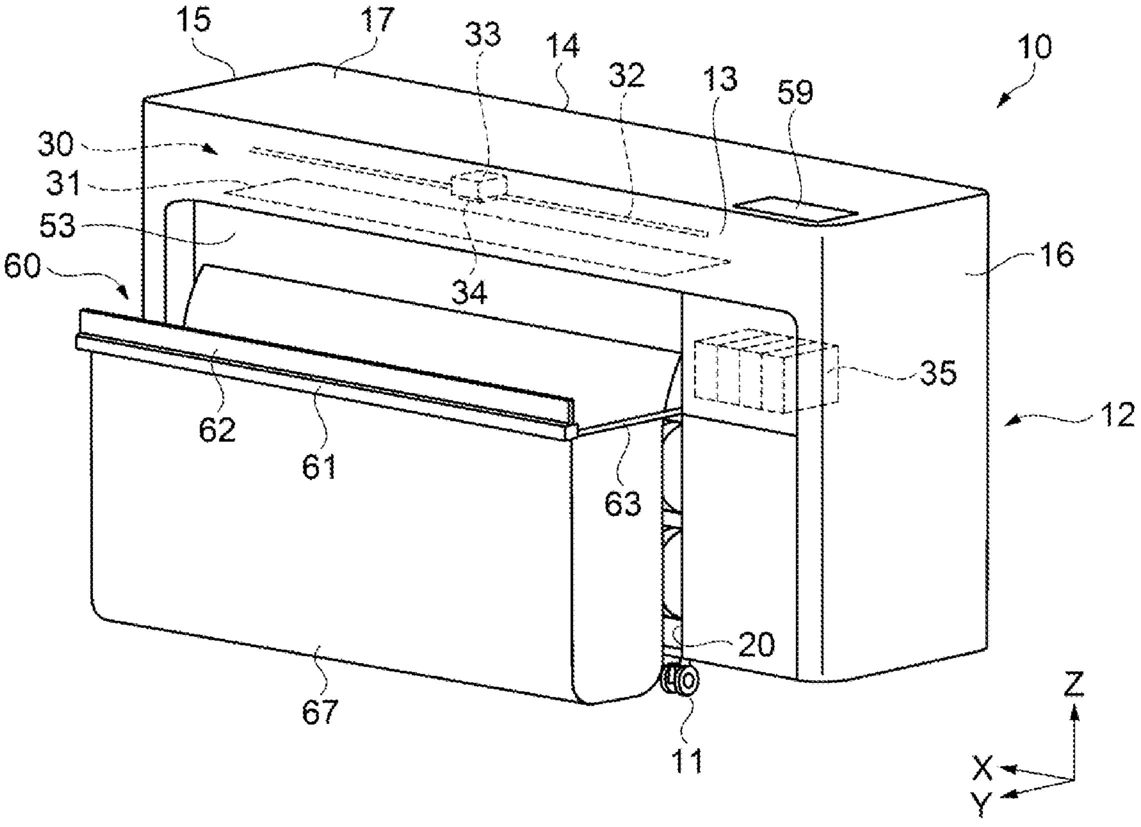
FIG. 2 is a perspective view illustrating a recording device in a state where an operating portion is separated.
Figure 3:
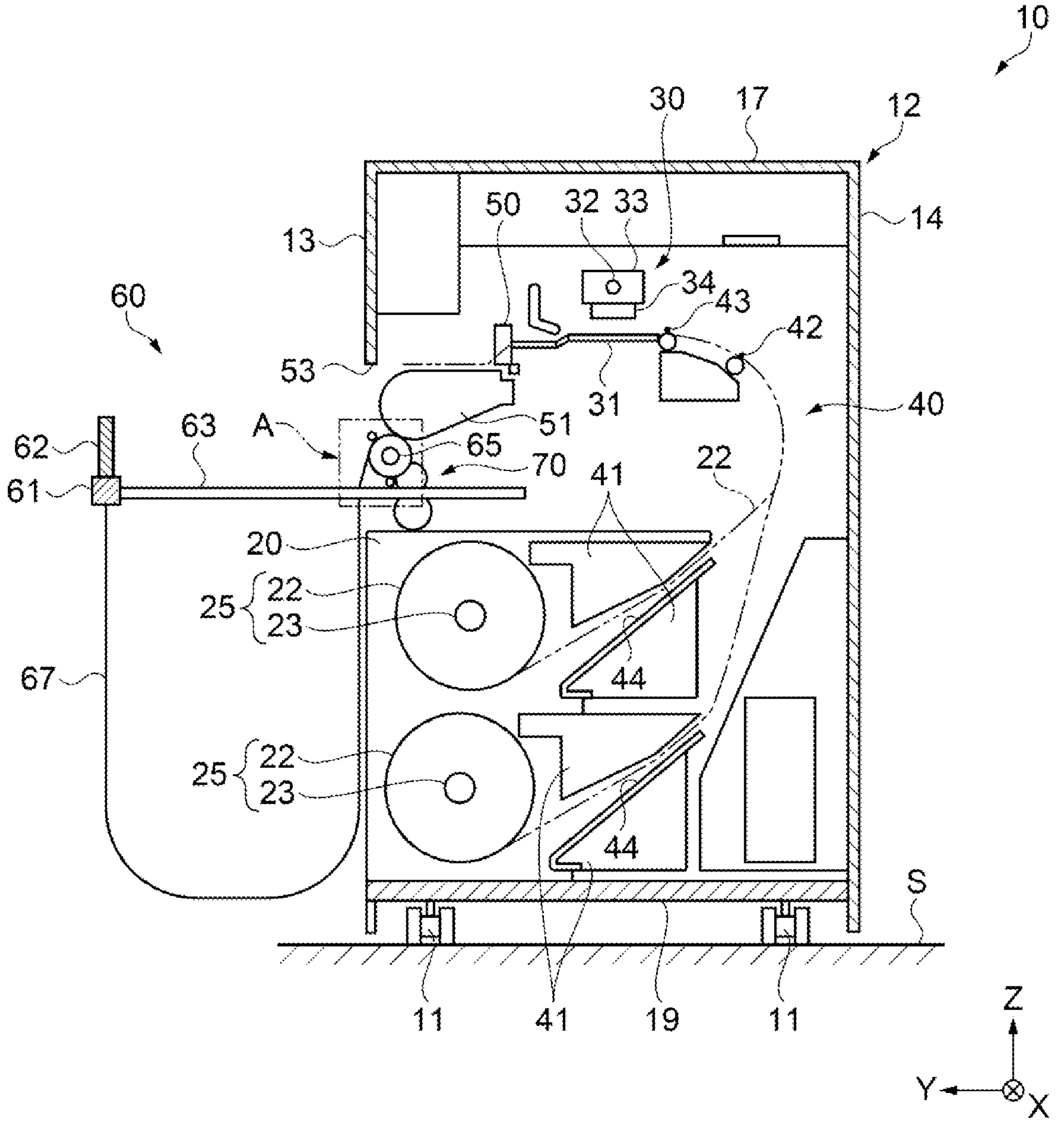
FIG. 3 is a cross-sectional view illustrating an internal configuration of a recording device.

As illustrated in FIGS. 1, 2, and 3, the recording device 10 includes a recording unit 30 accommodated in a housing 12 to perform recording on a medium 22, and a medium receiving unit 60 that receives the medium 22 discharged from the housing 12.

The recording device 10 includes the housing 12 having a substantially rectangular parallelepiped shape that is long in the left-right direction. The housing 12 has a front wall 13, a rear wall 14, a first side wall 15, a second side wall 16, and an upper wall 17. The housing 12 is coupled to a base frame 19 that is supported by legs 11. The recording device 10 is installed on the installation surface S with the legs 11 disposed therebetween. In the recording device 10, the Z direction in which the base frame 19 and the upper wall 17 face each other is the height direction of the recording device 10. The X direction in which the first side wall 15 and the second side wall 16 face each other is the left-right direction of the recording device 10. The Y direction in which the front wall 13 and the rear wall 14 face each other is the front-rear direction of the recording device 10. When the recording device 10 is disposed on a horizontal surface, the Z direction is a direction parallel to the vertical line.

In addition to the recording unit 30 that performs recording on the medium 22, an accommodation portion 20 that receives a roll body 25 in which the medium 22 is wound in a cylindrical shape, a transport unit 40 that transports the medium 22, and a cutting unit 50 that cuts the medium 22 are provided in the housing 12.

A plurality of openings is formed in the front wall 13 of the housing 12. A roll body accommodation port 27 for accommodating the roll body 25 is formed on the base frame 19 side below the front wall 13. In addition, an opening 53 is formed on the upper side of the roll body accommodation port 27, the opening 53 having the functions of a discharge port for discharging the recorded medium 22 and a feed port for feeding an receiving member 67, to be described later, accommodating the discharged medium 22. The medium 22 is discharged from the upper side of the opening 53, and the receiving member 67 is fed from the lower side of the opening 53. In the present embodiment, a configuration in which the discharge port and the feed port are formed by one opening 53 is illustrated, but the discharge port and the feed port may be provided independently.

A cylindrical roll body 25 formed by winding the long medium 22 around a core member 23 is accommodated in the accommodation portion 20 so as to be detachable from the roll body accommodation port 27. In the present embodiment, the accommodation portion 20 can accommodate the two roll bodies 25 long in the X direction in a state being arranged in the Z direction. A pair of holding members 28 that holds the roll body 25 so as to be rotatable with respect to the accommodation portion 20 is attached to both ends of the roll body 25. When the roll body 25 is rotated, the medium 22 wound around the roll body 25 is delivered to the rear wall 14 side inside the housing 12.

The transport unit 40 transports the medium 22 delivered from the roll body 25. The transport unit 40 includes a transport path forming portion 41, an intermediate roller 42, and a transport roller 43.

The transport path forming portion 41 is provided corresponding to each of the two roll bodies 25. The transport path forming portion 41 is located on the rear wall 14 side with respect to each of the two roll bodies 25 accommodated in the accommodation portion 20. The transport path forming unit 41 forms a transport path 44 that guides the medium 22 delivered from the roll body 25 toward the rear wall 14 side of the housing 12 by the rotation of the roll body 25.

The intermediate roller 42 and the transfer roller 43 transport the medium 22 having passed through the transport path 44 to the recording unit 30. The intermediate roller 42 and the transport roller 43 are constituted by a driving roller and a driven roller, which are a pair of rollers that are rotatably supported with an axis along the X direction as a rotation axis. The intermediate roller 42 and the transport roller 43 sandwich and sandwich the medium 22 between the driving roller and the driven roller from both the front and back sides. When the driving rollers of the intermediate roller 42 and the transfer roller 43 are rotated, the medium 22 is transported to the support 31 through the transport path 44 and is transported on the support 31 from the rear wall 14 side to the front wall 13 side. Note that FIG. 3 illustrates a state in which the medium 22 is delivered from both of the two roll bodies 25, but during actual recording, the medium 22 is delivered from either one of the two roll bodies 25.

The recording unit 30 includes the support 31, a guide shaft 32, a carriage 33, and a recording head 34.

The support 31 is located closer to the upper wall 17 side than the accommodation portion 20. The support 31 is a planar member extending in the X direction in the housing 12, and supports the medium 22 transported by the transport unit 40. The guide shaft 32 is located closer to the upper wall 17 side than the support platform 31. The guide shaft 32 is a rod-shaped member extending in the X direction. The guide shaft 31 slidably supports the carriage 32.

The recording head 34 is mounted on the carriage 33. The recording head 34 is located on the support 31 side with respect to the carriage 33. The recording head 34 can reciprocate along the guide shaft 32 together with the carriage 33. The recording head 34 is coupled to the cartridge 35 containing ink by a flexible tube (not illustrated). The cartridge 35 is accommodated at a position closer to the upper wall 17 side than the accommodating portion 20, the position being closer to the second side wall 16 side than the accommodating portion 20. The recording head 34 performs recording on the medium 22 by discharging ink onto the medium 22 supported by the support 31 while moving in the X direction.

The cutting unit 50 is located closer to the front wall 13 side than the recording unit 30. The cutting unit 50 has a fixed blade and a movable blade movable with respect to the fixed blade, and cuts the medium 22 located between the fixed blade and the movable blade. The cut medium 22 is supported by a discharge port member 51 that guides the medium 22 to the upper side of the opening 53 formed in the front wall 13 and is discharged to the outside of the housing 12.

The recording device 10 includes an input unit 59. The input unit 59 is provided on an upper surface of the upper wall 17 of the housing 12. The input unit 59 is located at a corner formed by a portion where the front wall 13 is coupled to the upper wall 17 and a portion where the second side wall 16 is coupled to the upper wall 17. The input unit 59 is configured, for example, by a liquid crystal display device provided with a touch panel, and is used when a user inputs various types of information.

Figure 4:
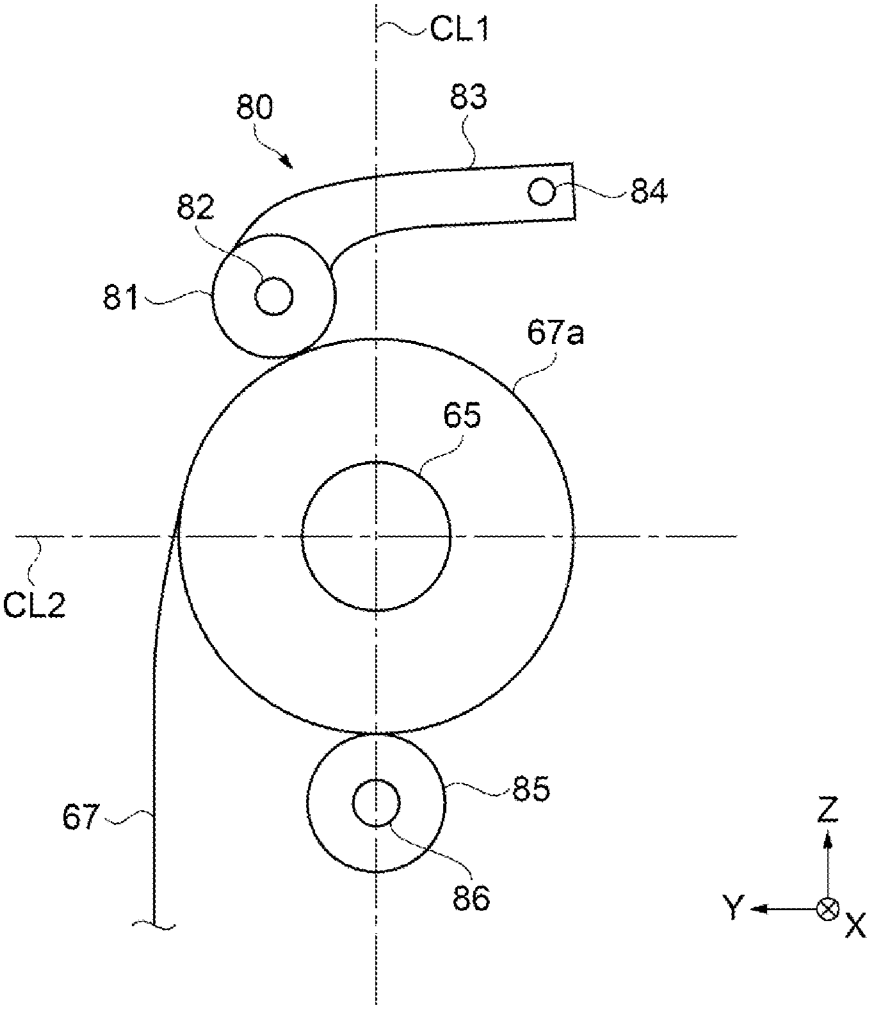
FIG. 4 is an enlarged view illustrating the portion A in FIG. 3 at an enlarged scale.

As illustrated in FIGS. 3 and 4, the medium receiving unit 60 includes an operating portion 61, a supporting portion 63, a rotating shaft 65, an receiving member 67, and the like.

The rotating shaft 65 is provided inside the housing 12 between the accommodating portion 20 and the discharge port member 51. The rotating shaft 65 has a cylindrical shape long in the X direction, and the length thereof is longer than the width of the medium 22. The rotating shaft 65 is rotatably supported with respect to the housing 12.

The operating portion 61 is a rod-shaped member long in the X direction. Both ends of the operating portion 61 are supported by a pair of support portions 63 that protrudes from the front wall 13 side of the housing 12 so as to advance and retract in the +Y direction. The pair of support portions 63 protrudes outside the housing 12 from between the rotating shaft 65 and the accommodating portion 20. That is, the operating portion 61 can be separated from the housing 12 and can be displaced between a mounting state where it is mounted on the housing 12 and a separated state where it is separated from the housing 12 as the pair of support portions 63 advances and retracts.

The receiving member 67 is a flexible elongated sheet-shaped member. One end of the receiving member 67 is coupled to the rotating shaft 65, and the other end of the receiving member 67 is coupled to the operating portion 61. The rotating shaft 65 rotates forward or reverse in conjunction with the advancement and retraction of the support portion 63.

Figure 5:
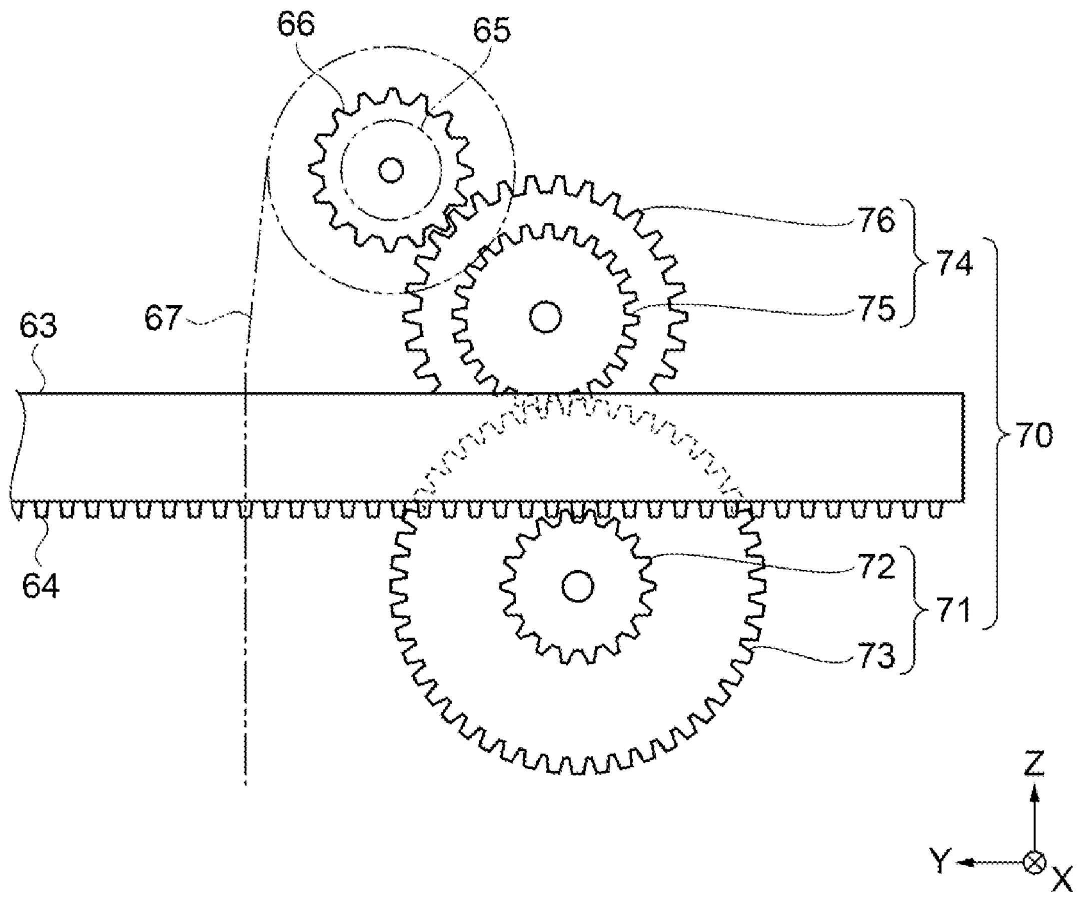
FIG. 5 is a plan view of a power transmission configuration between a support portion and a rotating shaft as viewed from a side surface.
Figure 6:
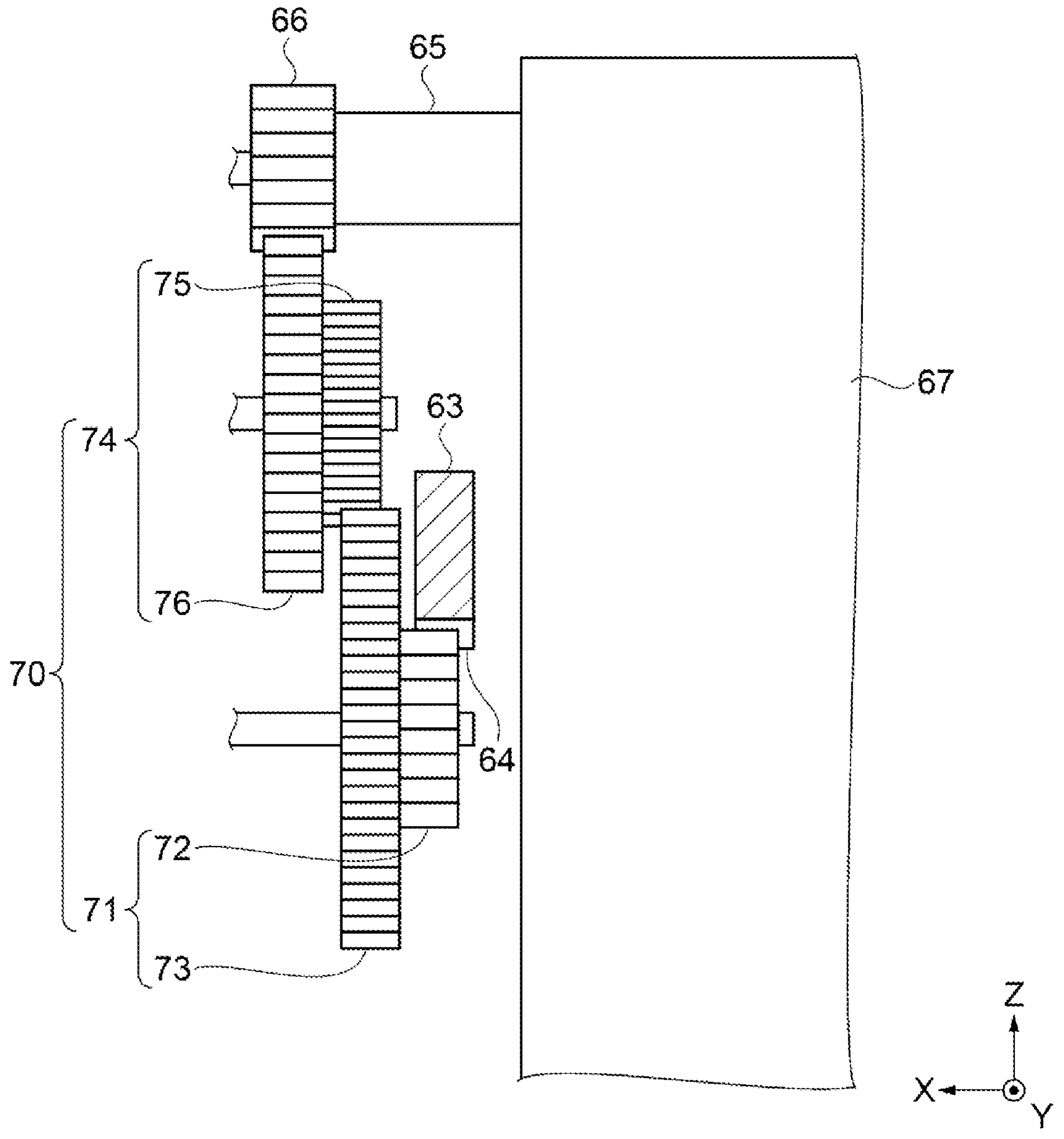
FIG. 6 is a plan view of a power transmission configuration between a support portion and a rotating shaft as viewed from the front side.

As illustrated in FIGS. 5 and 6, a rack 64 is provided on at least one of the pair of support portions 63. The rack 64 is a planar rod with a plurality of teeth cut at equal pitches. In the recording device 10 of the present embodiment, the rack 64 is provided on the −Z side surface of both of the supporting portions 63. On the other hand, a rotating shaft gear 66 that rotates in conjunction with the movement of the rack 64 is provided on the rotating shaft 65. Furthermore, a speed increasing mechanism 70 for increasing the rotation speed of the rotating shaft gear 66 is provided between the rack 64 and the rotating shaft gear 66.

The speed increasing mechanism 70 includes a first composite gear 71 and a second composite gear 74 as a composite gear in which gears having different number of teeth are stacked. The first composite gear 71 has a first gear 72 that engages with the rack 64, and a second gear 73 having a larger diameter and a greater number of teeth than the first gear 72, the first and second gears 72 and 73 being formed on the same shaft. When the rack 64 and the first gear 72 engage with each other, the linear movement associated with the advancement and retraction of the support 63 is converted to the rotational force of the first composite gear 71. The second composite gear 74 has a third gear 75 that engages with the second gear 73 and has a smaller diameter and a smaller number of teeth than the second gear 73, and a fourth gear 76 having a larger diameter and a greater number of teeth than the third gear 75, the third and fourth gears 75 and 76 being formed on the same shaft.

For example, when the number of teeth of the second gear 73 is twice the number of teeth of the first gear 72, the third gear 75 engaging with the second gear 73 rotates at a speed that is twice as fast as when the first gear 72 and the third gear 75 are directly engaged. In other words, the first composite gear 71 increases the rotation speed of the second composite gear 74. Similarly, the second composite gear 74 increases the rotation speed of the rotating shaft gear 66.

Note that in the present embodiment, the speed increasing mechanism 70 constituted by two gears of the first and second composite gears 71 and 74 is illustrated, but the speed increasing mechanism 70 may be configured as one composite gear, or three or more composite gears. Additionally, the speed increasing mechanism may be configured by combining a plurality of large and small spur gears having different diameters and numbers of teeth.

The receiving member 67 is wound around the rotating shaft 65 and is accommodated inside the housing 12 when the operating portion 61 is displaced from the separated state to the mounting state. In addition, when the operating portion 61 is displaced from the mounting state to the separated state, the receiving member 67 is fed out of the housing 12 from the rotating shaft 65 via the lower side of the opening 53 to create a state where it can accommodate the medium 22 discharged from the upper side of the opening 53. The recording device 10 according to the present embodiment is configured such that the speed increasing mechanism 70 causes the feeding amount of the receiving member 67 fed from the rotating shaft 65 to be greater than the movement amount of the pair of supporting portions 63 in the +Y direction. As a result, the receiving member 67 forms a sag between the operating portion 61 and the rotating shaft 65.

The operating portion 61 has a front plate 62 that forms a part of the front wall 13 of the housing 12 in the mounting state. The front plate 62 is a planar member that is long in the X direction that rises from the operating portion 61 in the +Z direction. The opening 53 is blocked by the front plate 62 when the operating portion 61 is in the mounting state. In the mounting state, the front plate 62 forms the same surface as the front wall 13. In the present embodiment, the lower portion of the opening 53 in which the receiving member 67 is fed is blocked by the front plate 62.

Note that in the present embodiment, a configuration in which the feeding amount of the receiving member 67 is greater than the movement amount of the supporting portion 63 using the speed increasing mechanism 70 has been illustrated, but the present invention is not limited thereto. For example, the configuration in which the feeding amount of the receiving member 67 is greater than the movement amount of the supporting portion 63 may be realized using a rotating shaft having an outer circumference longer than the movement amount of the supporting portion 63 necessary for one rotation of the rotating shaft.

As illustrated in FIG. 4, the medium receiving unit 60 has a contact portion 80 and an auxiliary roller 85. The contact portion 80 comes into contact with an outer circumferential surface 67*a* of the roll-shaped receiving member 67 wound around the rotating shaft 65 to presses the receiving member 67 against the rotating shaft 65. The contact portion 80 is provided on both ends in the axial direction of the rotating shaft 65, that is, in the X direction.

The contact portion 80 has a contact roller 81 and an arm 83. The contact roller 81 is a driven roller that is rotated in contact with the outer circumferential surface 67*a* of the receiving member 67 that rotates with the rotating shaft 65 when the receiving member 67 is wound around or fed from the rotating shaft 65. The arm 83 is located above the rotating shaft 65. One end of the arm 83 is located closer to the −Y direction than the vertical line CL1 that intersects the axis of the rotating shaft 65, and is rotatably supported by an arm shaft 84 that extends in the X direction. The other end of the arm 83 is located closer to the +Y direction than the vertical line CL1 and rotatably supports the contact roller 81 via a contact roller shaft 82. That is, the contact roller 81 comes into contact with the roll-shaped receiving member 67 between a straight line of the vertical line CL1 that extends in the +Z direction from the axis of the rotating shaft 65 and a straight line of a horizontal line CL2 that extends in the +Y direction from the axis of the rotating shaft 65, the horizontal inertia CL2 intersecting the axis of the rotating shaft 65.

The contact roller 81 presses the roll-shaped receiving member 67 wound around the rotating shaft 65 against the rotating shaft 65 with the aid of a pressing member (not illustrated) that presses the arm 83 downward. As a result, the contact roller 81 can be brought into contact with the outer circumferential surface 67*a* of the receiving member 67 in conformance with the radius of the roll-shaped receiving member 67 that changes according to the rotation of the rotating shaft 65.

Note that in the present embodiment, a configuration in which the contact portion 80 is provided at both ends of the rotating shaft 65 is illustrated, but a plurality of contact portions may be further provided in addition to those at both ends.

The auxiliary roller 85 comes into contact with the outer circumferential surface 67*a* of the roll-shaped receiving member 67 wound around the rotating shaft 65 to press the receiving member 67 against the rotating shaft 65. The auxiliary roller 85 is a driven roller that is rotated in contact with the outer circumferential surface 67*a* of the receiving member 67 that rotates when the receiving member 67 is wound around or fed from the rotating shaft 65. The auxiliary roller 85 is located below the horizontal line CL2 that intersects the axis of the rotating shaft 65 and is rotatably supported via an auxiliary roller shaft 86. Furthermore, the auxiliary roller 85 is preferably provided at a position overlapping the vertical line CL1 that intersects the axis of the rotating shaft 65.

The auxiliary roller 85 presses the roll-shaped receiving member 67 wound around the rotating shaft 65 against the rotating shaft 65 with the aid of a pressing member that presses the auxiliary roller shaft 86 upward. As a result, the auxiliary roller 85 can be brought into contact with the outer circumferential surface 67*a* of the receiving member 67 in conformance with the radius of the roll-shaped receiving member 67 that changes according to the rotation of the rotating shaft 65. One or more auxiliary rollers 85 are provided along the X direction of the rotating shaft 65.

Note that in the present embodiment, the recording device 10 is illustrated as a processing device provided with the recording unit 30 that performs recording by an ink-jet method as a processing unit, but the present invention is not limited thereto. The processing device may be a recording device other than an ink-jet recording device, and may be a copying device, a fax device, a multi-functional device provided with a plurality of these functions, or the like.

As described above, according to the recording device and the recording method according to the present embodiment, the effects below can be obtained.

The processing device includes a processing unit that processes the medium 22, and the medium receiving unit 60 that receives the medium 22 discharged from the housing 12. The medium receiving unit 60 includes the sheet-shaped receiving member 67, the rotating shaft 65 to which one end of the receiving member 67 is coupled, and the operating portion 61 to which the other end of the receiving member 67 is coupled. When the operating portion 61 is mounted on the housing 12, the receiving member 67 is wound around the rotating shaft 65 and accommodated in the housing 12. When the operating portion 61 is separated from the housing 12, the receiving member 67 is fed from the rotating shaft 65 and the medium 22 can be accommodated therein. The receiving member 67 for accommodating the medium 22 is accommodated in the housing 12 in a state of being wound around the rotating shaft 65. Due to this, by accommodating the medium receiving unit 60 in a narrow space, it is possible to provide a processing device having a reduced device size.

The medium receiving unit 60 includes the pair of support portions 63 that protrudes from the housing 12 in a retractable manner and supports both ends of the operating portion 61, the rack 64 provided on the supporting portion 63, and the rotating shaft gear 66 provided on the rotating shaft 65. The rack 64 moves along with the advancement and retraction of the support 63. The rotating shaft 65 rotates with the rotating shaft gear 66 that rotates in conjunction with the movement of the rack 64. As a result, the sheet-shaped receiving member 67 can be easily wound or fed around the rotating shaft 65.

The rack 64 is provided on both of the pair of support portions 63. As a result, regardless of the gripping position of the operating portion 61 gripped in order to move the support portion 63 back and forth, the receiving member 67 can be stably wound or fed around the rotating shaft 65.

The feeding amount of the receiving member 67 is greater than the movement amount of the supporting portion 63. As a result, the receiving member 67 sags between the operating portion 61 and the rotating shaft 65, and thus the medium 22 can be suitably accommodated in the sagging portion.

The speed increasing mechanism 70 for increasing the rotation speed of the rotating shaft gear 66 is provided between the rack 64 and the rotating shaft gear 66. As a result, since the feeding amount of the receiving member 67 is greater than the movement amount of the support portion 63, the receiving member 67 can be loosened between the operating portion 61 and the rotating shaft 65.

The speed increasing mechanism 70 includes the first and second composite gears 71 and 74 in which gears having different numbers of teeth are stacked. As a result, the speed increasing mechanism 70 can be easily formed.

The processing device has the contact portion 80 that comes into contact with the outer circumferential surface 67*a* of the receiving member 67 wound around the rotating shaft 65, and presses the receiving member 67 against the rotating shaft 65. As a result, the frictional force between the rotating shaft 65 and the receiving member 67 increases, and when the receiving member 67 wound in a roll shape is fed, the rotating shaft 65 can be prevented from idling with respect to the receiving member 67. Accordingly, the receiving member 67 wound around the rotating shaft 65 can be suitably fed.

The contact portion 80 is provided at both ends in the axial direction of the rotating shaft 65. As a result, the effect of suppressing the rotating shaft 65 from idling with respect to the receiving member 67 is improved.

The contact portion 80 has the contact roller 81 that is driven by the rotation of the receiving member 67. As a result, the receiving member 67 can be pressed against the rotating shaft 65 without hindering the rotation of the rotating shaft 65.

The contact roller 81 is provided between a straight line of the horizontal line CL2 that extends from the rotating shaft 65 toward the operating portion 61 side, the horizontal line CL2 intersecting the axis of the rotating shaft 65 and a straight line of the vertical line CL1 that extends upward from the rotating shaft 65, the vertical line CL1 intersecting the axis of the rotating shaft 65. As a result, the receiving member 67 can be suitably fed toward the operating portion 61 side.

The processing device has the auxiliary roller 85 that comes into contact with the outer circumferential surface 67*a* of the receiving member 67 wound around the rotating shaft 65 below the horizontal line CL2 that intersects the axis of the rotating shaft 65. As a result, the receiving member 67 wound around the rotating shaft 65 can be prevented from being unwound and sagging below the rotating shaft 65.

The opening 53 in which the accommodating portion 67 is fed is formed in the housing 12, and at least a portion of the opening 53 is blocked in a state in which the operating portion 61 is mounted on the housing 12. As a result, the design of the device when the operating portion 61 is mounted can be improved.

The operating portion 61 has the front plate 62 that forms a part of the housing 12 in a state where the operating portion 61 is mounted on the housing 12. As a result, a large opening 53 for feeding the receiving member 67 can be formed without impairing the design of the device.

The recording device 10 includes the recording unit 30 that performs recording on the medium 22 as a processing unit. As a result, by accommodating the medium receiving unit 60 in a narrow space, it is possible to provide the recording device 10 having a reduced device size.

What is claimed is:

1. A processing device comprising:

a processing unit accommodated in a housing and configured to process a medium; and a medium receiving unit that receives the medium discharged from the housing, the medium receiving unit including:

a flexible sheet-shaped receiving member;

a rotating shaft provided inside the housing and to which one end of the receiving member is coupled;

an operating portion provided separably from the housing and to which the other end of the receiving member is coupled;

a pair of support portions that protrude from the housing in a retractable manner and supports both ends of the operating portion;

a rack provided on at least one of the pair of support portions; and a rotating shaft gear provided on the rotating shaft and configured to rotate in conjunction with movement of the rack, wherein the receiving member is wound around the rotating shaft and accommodated inside the housing when the operating portion is mounted on the housing, and the receiving member is fed from the rotating shaft so as to receive the medium when the operating portion is separated from the housing.

2. The processing device according to claim 1, wherein the rack is provided on both of the pair of support portions.

3. The processing device according to claim 1, wherein a feeding amount of the receiving member is greater than a movement amount of the pair of support portions.

4. The processing device according to claim 1, wherein a speed increasing mechanism provided between the rack and the rotating shaft gear and configured to increase a rotation speed of the rotating shaft gear.

5. The processing device according to claim 4, wherein the speed increasing mechanism includes a composite gear in which gears having different numbers of teeth are stacked.

6. The processing device according to claim 1, comprising:

a contact portion that comes into contact with an outer circumferential surface of the receiving member wound around the rotating shaft to press the receiving member against the rotating shaft.

7. The processing device according to claim 6, wherein the contact portion is provided at both ends in an axial direction of the rotating shaft.

8. The processing device according to claim 6, wherein the contact portion has a contact roller that is driven by rotation of the receiving member.

9. The processing device according to claim 8, wherein the contact roller is provided between a straight line that is a horizontal line intersecting an axis of the rotating shaft and extends from the rotating shaft toward the operating portion, and a straight line that is a vertical line intersecting the axis of the rotating shaft and extends upward from the rotating shaft.

10. The processing device according to claim 6, comprising:

an auxiliary roller that comes into contact with an outer circumferential surface of the receiving member wound around the rotating shaft below a horizontal line intersecting the axis of the rotating shaft.

11. The processing device according to claim 1, wherein an opening through which the receiving member is fed is formed in the housing, and the opening is blocked in a state where the operating portion is mounted on the housing.

12. The processing device according to claim 1, wherein the operating portion has a front plate that forms a part of the housing in a state where the operating portion is mounted on the housing.

13. A recording device comprising:

a recording unit that performs recording on a medium as the processing device according to claim 1.

* * * * *